(12) United States Patent
Park et al.

(10) Patent No.: US 11,528,516 B2
(45) Date of Patent: Dec. 13, 2022

(54) DISTRIBUTED TRANSCODING METHOD AND DISTRIBUTED TRANSCODING SYSTEM

(71) Applicant: NAVER CORPORATION, Seongnam-si (KR)

(72) Inventors: Kuenbaek Park, Seongnam-si (KR); Bong Sub Kim, Seongnam-si (KR); Jae Hoon Kim, Seongnam-si (KR); Seongcheol Jo, Seongnam-si (KR); Seungjin Kim, Seongnam-si (KR); Seung Ha Yang, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 0 days.

(21) Appl. No.: 16/884,423

(22) Filed: May 27, 2020

(65) Prior Publication Data

US 2020/0322659 A1 Oct. 8, 2020

Related U.S. Application Data

(63) Continuation of application No. PCT/KR2018/014816, filed on Nov. 28, 2018.

(30) Foreign Application Priority Data

Nov. 29, 2017 (KR) .......... 10-2017-0161575

(51) Int. Cl.
*H04N 21/2343* (2011.01)
*H04N 19/40* (2014.01)
(Continued)

(52) U.S. Cl.
CPC ...... *H04N 21/234309* (2013.01); *H04N 19/40* (2014.11); *H04N 21/2326* (2013.01); *H04N 21/2405* (2013.01); *H04N 21/2662* (2013.01)

(58) Field of Classification Search
CPC ....... H04N 21/234309; H04N 21/2326; H04N 21/2405; H04N 21/2662; H04N 19/40
See application file for complete search history.

(56) References Cited

U.S. PATENT DOCUMENTS 8,338,467 B2 * 12/2012 Kolasa .................. A61P 29/00
514/370
9,800,883 B2 * 10/2017 Gadepalli ............. H04N 19/85
(Continued)

FOREIGN PATENT DOCUMENTS

JP 2005176069 A 6/2005
JP 2011009833 A 1/2011
(Continued)

OTHER PUBLICATIONS

ISR issued in Int'l. Application No. PCT/KR2018/014816, dated Mar. 11, 2019.
(Continued)

*Primary Examiner* — James R Sheleheda
(74) *Attorney, Agent, or Firm* — Greer Burns & Crain Ltd.

(57) ABSTRACT

A distributed transcoding method includes splitting image content into segments of a fixed interval; allocating the split segments to a plurality of workers and performing parallel transcoding; and concatenating the transcoded segments and merging same into one encoded file.

17 Claims, 9 Drawing Sheets

(51) Int. Cl.
*H04N 21/232* (2011.01)
*H04N 21/24* (2011.01)
*H04N 21/2662* (2011.01)

(56) References Cited

U.S. PATENT DOCUMENTS

| | | | | |
|---|---|---|---|---|
| 10,003,550 | B1* | 6/2018 | Babcock | H04L 47/823 |
| 10,375,156 | B2* | 8/2019 | Coward | H04N 19/436 |
| 2001/0010707 | A1* | 8/2001 | Matsumura | H04N 19/40 |
| | | | | 375/E7.198 |
| 2008/0160911 | A1* | 7/2008 | Chou | H04N 21/835 |
| | | | | 455/7 |
| 2009/0136209 | A1* | 5/2009 | Nonaka | H04N 21/4402 |
| | | | | 386/231 |
| 2013/0104177 | A1* | 4/2013 | Kwan | H04N 21/8456 |
| | | | | 725/93 |
| 2014/0016708 | A1* | 1/2014 | Wang | H04N 19/50 |
| | | | | 375/240.25 |
| 2014/0119459 | A1* | 5/2014 | Kumar | H04N 19/89 |
| | | | | 375/240.27 |
| 2014/0153909 | A1 | 6/2014 | Macinnis et al. | |
| 2015/0244757 | A1 | 8/2015 | Zhuang et al. | |
| 2015/0271531 | A1* | 9/2015 | Wen | H04N 19/196 |
| | | | | 375/240.16 |
| 2016/0219286 | A1* | 7/2016 | Gadepalli | H04N 19/40 |
| 2016/0248834 | A1 | 8/2016 | Richards et al. | |
| 2016/0249079 | A1* | 8/2016 | Malone | H04N 21/234309 |
| 2017/0078376 | A1* | 3/2017 | Coward | H04N 19/436 |
| 2018/0332281 | A1* | 11/2018 | Yu | H04N 19/176 |
| 2019/0124366 | A1* | 4/2019 | Zhao | H04N 19/124 |
| 2020/0037014 | A1* | 1/2020 | Dahl | H04N 21/632 |
| 2021/0006850 | A1* | 1/2021 | Ha | H04N 21/4788 |

FOREIGN PATENT DOCUMENTS

| | | |
|---|---|---|
| KR | 1020050091369 A | 9/2005 |
| KR | 1020090087092 A | 8/2009 |
| KR | 1020150046655 A | 4/2015 |
| KR | 1020160118989 A | 10/2016 |
| KR | 1020170096511 A | 8/2017 |

OTHER PUBLICATIONS

Yasuo Sambe et al., "A Distributed High Speed Video Transcoding System", Multimedia, Distribution, Cooperation and Mobile (DICOMO 2003) Symposium Thesis Collection 1997-2006 Ver.1.1, Japan, Inc. Journalism Society, Jun. 4, 2003, No. 9, pp. 409-412.

Japanese Office Action issued in corresponding Japanese patent application No. 2020-529298, dated Jun. 29, 2021.

* cited by examiner

DISTRIBUTED TRANSCODING METHOD AND DISTRIBUTED TRANSCODING SYSTEM

CROSS-REFERENCE TO RELATED APPLICATIONS

This is a continuation application of International Application No. PCT/KR2018/014816, filed Nov. 28, 2018, which claims the benefit of Korean Patent Application No. 10-2017-0161575, filed Nov. 29, 2017.

BACKGROUND OF THE INVENTION

Field of Invention

Example embodiments of the following description relate to technology for processing distributed transcoding.

Description of Related Art

Currently, with expansion of video services of video on demand (VOD) systems and various portals, there is an increasing need for transcoding (encoding) the same video content to be suitable for a system that provides a service.

In general, a video service provider performs encoding and transcoding through a compression algorithm (e.g., MPEG2 or H.264) by using a separate encoding server.

For example, technology for transforming a video coded to a single format to another video coding format is described in Korean Patent Laid-Open Publication No. 10-2005-0091369 (published on Sep. 15, 2005).

Since video encoding, particularly, encoding of a high definition (HD) video uses large central processing unit (CPU) load, an encoding system encodes only a single video file at a single encoding server.

Such a configuration disrupts a demand for a prompt service when providing real-time broadcast content as a VOD service. Existing video services do not provide a smooth service due to an increase in an amount of time used for encoding and transcoding.

BRIEF SUMMARY OF THE INVENTION

One or more example embodiments of the present invention provide distributed transcoding technology for splitting an original image into segments of a desired interval and performing parallel transcoding.

One or more example embodiments provide a method and system that may maximize a distributed encoding performance through an optimized concatenation process of appropriately distributing segments based on the overall technology and infrastructure, such as, for example, a server, a network, and an encoding time, and quickly gathering encoded segments.

According to at least one example embodiment, there is provided a distributed transcoding method performed by a server implemented as a computer, the distributed transcoding method including splitting image content into segments of a desired interval; allocating the split segments to a plurality of workers and performing parallel transcoding; and concatenating the transcoded segments and merging the concatenated segments into a single encoded file.

According to an aspect, the splitting of the image content may include splitting the image content through a logical splitting of designating a read offset of each segment.

According to another aspect, the splitting may include splitting the image content through a logical splitting of designating a read offset of each segment, the performing may include forwarding read offset information of each segment to a worker to which a corresponding segment is allocated, and each worker may read a file of the corresponding segment using read offset information of the allocated segment and perform encoding.

According to still another aspect, the splitting may include splitting the image content into segments of a group of pictures (GOP) unit or into segments of a minimum unit determined through a pre-experiment.

According to still another aspect, the performing of the parallel transcoding may include allocating segments based on a priority using at least one of a number of simultaneously available encodings and an idle time of a worker.

According to still another aspect, the performing may include allocating central processing unit (CPU) resources to each worker to which a segment is allocated, based on an image complexity of the segment.

According to still another aspect, the merging of the concatenated segments may include receiving an encoded segment file from each worker and storing the received segment file in a storage; and sequentially concatenating segment files stored in the storage and generating a result packet for the image content.

According to still another aspect, the distributed transcoding method may include adjusting a number of workers allocated to the image content during encoding of the image content.

According to still another aspect, the adjusting of the number of workers may include decreasing an encoding speed for the image content by excluding a portion of workers from a worker pool allocated to the image content.

According to still another aspect, the adjusting may include increasing an encoding speed for the image content by adding at least one worker to a worker pool allocated to the image content.

According to at least one example embodiment, there is provided a non-transitory computer-readable record medium storing a program to implement the distributed transcoding method described above.

According to at least one example embodiment, there is provided a distributed transcoding system at a server implemented as a computer, the distributed transcoding system including at least one processor configured to execute computer-readable instructions included in a memory. The at least one processor is configured to perform a process of splitting image content into segments of a desired interval, a process of allocating the split segments to a plurality of workers and performing parallel transcoding, and a process of concatenating the transcoded segments and merging the concatenated segments into a single encoded file.

According to some example embodiments, it is possible to further improve the time enhancement of encoding and transcoding by splitting an original image into segments of a desired interval and by performing parallel transcoding.

According to some example embodiments, it is possible to maximize distributed encoding performance through an optimized concatenation process of appropriately distributing segments based on the overall technology and infrastructure, such as, for example, a server, a network, and an encoding time, and quickly gathering encoded segments.

DETAILED DESCRIPTION OF THE INVENTION

Hereinafter, example embodiments of the present invention will be described with reference to the accompanying drawings.

Example embodiments relate to a distributed transcoder, and more particularly, to a method and system for splitting an image into segments and performing parallel transcoding to achieve improved time enhancement.

The example embodiments including disclosures provided herein may achieve many advantages through distributed transcoding in terms of time enhancement, cost saving, resilience, efficiency, and rationality.

Figure 1:
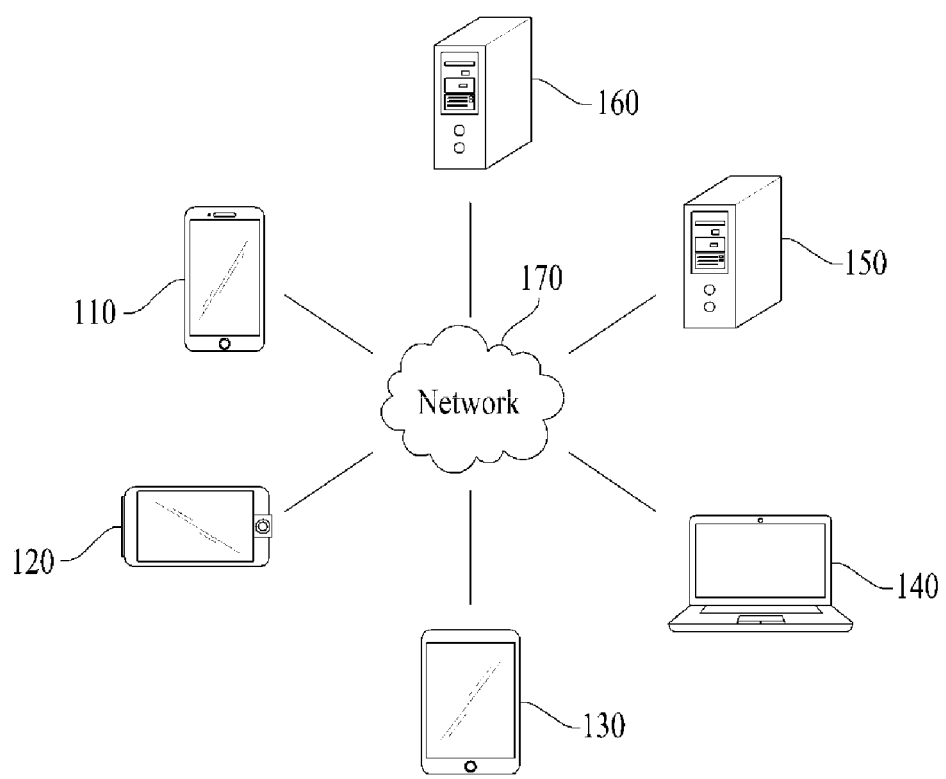
FIG. 1 is a diagram illustrating an example of a network environment according to one embodiment.

FIG. 1 is a diagram illustrating an example of a network environment according to one embodiment. Referring to FIG. 1, the network environment includes a plurality of electronic devices 110, 120, 130, 140, a plurality of servers 150, 160, and a network 170. FIG. 1 is provided as an example only and thus, a number of electronic devices or a number of servers is not limited thereto.

Each of the plurality of electronic devices 110, 120, 130, 140 may be a fixed terminal or a mobile terminal configured as a computer apparatus. For example, the plurality of electronic devices 110, 120, 130, 140 may be a smartphone, a mobile phone, a navigation, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, an augmented reality (AR) device, and the like. For example, although FIG. 1 illustrates a shape of a smartphone as an example of the electronic device 1 110, the electronic device 1 110 may refer to one of various physical computer apparatuses capable of communicating with other electronic devices 120, 130, 140 and/or the servers 150, 160 over the network 170 in a wireless communication manner or in a wired communication manner.

The communication scheme is not particularly limited and may include a communication method using a near field communication between devices as well as a communication method using a communication network, for example, a mobile communication network, the wired Internet, the wireless Internet, a broadcasting network, a satellite network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 170 may include at least one of network topologies that include a bus network, a star network, a ring network, a mesh network, a star-bus network, a tree or hierarchical network, and the like. However, these are provided as examples only and the example embodiments are not limited thereto.

Each of the servers 150, 160 may be configured as a computer apparatus or a plurality of computer apparatuses that provides instructions, codes, files, contents, services, and the like, through communication with the plurality of electronic devices 110, 120, 130, 140 over the network 170. For example, the server 150 may be a system that provides a first service to the plurality of electronic devices 110, 120, 130, 140 connected over the network 170. The server 160 may be a system that provides a second service to the plurality of electronic devices 110, 120, 130, 140 connected over the network 170. In detail, for example, the server 150 may provide a service, for example, a video service, desired by a corresponding application to the plurality of electronic devices 110, 120, 130, 140, as the first service through the application as a computer program installed and executed on the plurality of electronic devices 110, 120, 130, 140. As another example, the server 160 may provide, as the second service, a service that distributes a file for installing and executing the application to the plurality of electronic devices 110, 120, 130, 140.

Figure 2:
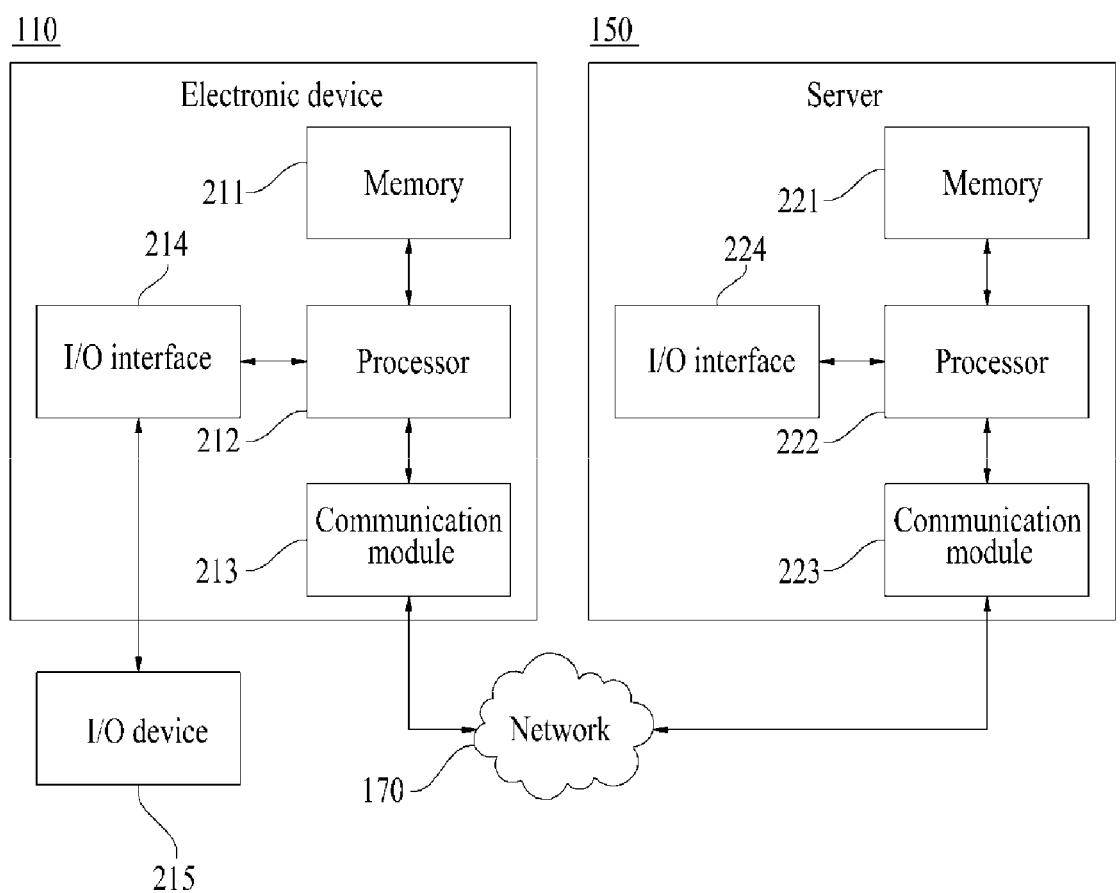
FIG. 2 is a block diagram illustrating a configuration of an electronic device and a server according to one embodiment.

FIG. 2 is a block diagram illustrating an example of an electronic device and a server according to an example embodiment. FIG. 2 illustrates a configuration of the electronic device 1 110 as an example for a single electronic device and illustrates a configuration of the server 150 as an example for a single server. The same or similar components may be applicable to other electronic devices 120, 130, 140, or the server 160.

Referring to FIG. 2, the electronic device 1 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device, such as a random access memory (RAM), a read only memory (ROM), a disk drive, a solid state drive (SSD), and a flash memory, as a non-transitory computer-readable record medium. The permanent mass storage device, such as ROM, SSD, flash memory, and disk drive, may be included in the electronic device 1 110 or the server 150 as a permanent storage device separate from the memory 211, 221. Also, an OS or at least one program code, for example, a code for a browser installed and executed on the electronic device 1 110 or an application installed and executed on the electronic device 1 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of the non-transitory computer-readable record medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process instructions of a computer program by performing basic arithmetic operations, logic operations, and I/O operations. The instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device 1 110 and the server 150 over the network 170 and may provide a function for communication between the electronic device 1 110 and/or the server 150 and another electronic device, for example, the electronic device 2 120, or another server, for example, the server 160. For example, the processor 212 of the electronic device 1 110 may transfer a request created based on a program code stored in the storage device, such as the memory 211, to the server 150 over the network 170 under the control of the communication module 213. Inversely, a control signal, an instruction, content, a file, etc., provided under the control of the processor 222 of the server 150 may be received at the electronic device 1 110 through the communication module 213 of the electronic device 1 110 by going through the communication module 223 and the network 170. For example, a control signal, an instruction, content, a file, etc., of the server 150 received through the communication module 213 may be transferred to the processor 212 or the memory 211, and content, a file, etc., may be stored in a record medium, for example, the permanent storage device, further includable in the electronic device 1 110.

The I/O interface 214 may be a device used for interfacing with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interfacing with an apparatus in which an input function and an output function are integrated into a single function, such as a touchscreen. The I/O device 215 may be configured as a single device with the electronic device 1 110. Also, the I/O interface 224 of the server 150 may be a device for interfacing with an apparatus (not shown) for input or output that may be connected to the server 150 or included in the server 150. In detail, when processing instructions of the computer program loaded to the memory 211, the processor 212 of the electronic device 1 110 may display a service screen configured using data provided from the server 150 or the electronic device 2 120, or may display content on a display through the I/O interface 214.

According to other example embodiments, the electronic device 1 110 and the server 150 may include a greater number of components than the number of components shown in FIG. 2. For example, the electronic device 1 110 may include at least a portion of the I/O device 215, or may further include other components, for example, a transceiver, a global positioning system (GPS) module, a camera, a variety of sensors, a database (DB), and the like. In detail, if the electronic device 1 110 is a smartphone, the electronic device 1 110 may be configured to further include a variety of components, for example, an accelerometer sensor or a gyro sensor, a camera module, various physical buttons, a button using a touch panel, an I/O port, a vibrator for vibration, etc., which are generally included in the smartphone.

Hereinafter, example embodiments of a distributed transcoding method and a distributed transcoding system are described.

Figure 3:
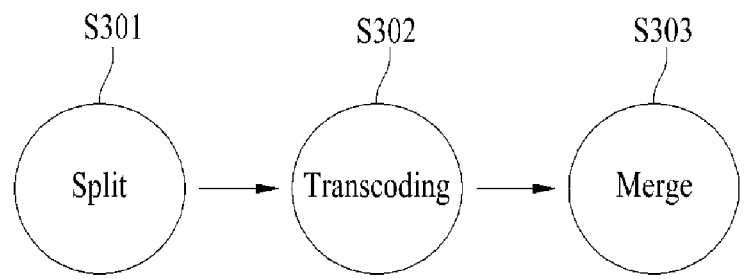
FIG. 3 is a flowchart illustrating an example of a distributed transcoding method according to one embodiment.

FIG. 3 is a flowchart illustrating a basic process for distributed transcoding according to an example embodiment.

The server 150 according to the example embodiment serves as a platform that provides a video service to a plurality of electronic devices 110, 120, 130, 140 that are clients. The server 150 may provide a video service through interaction with an application installed on the electronic devices 110, 120, 130, 140.

The server 150 may include the processor 222 as a component to perform the distributed transcoding method of FIG. 3. Depending on example embodiments, the processor 222 may be separated into at least two components for representation of functions of the processor 222.

The processor 222 may control the server 150 to perform operations S301 to S303 included in the distributed transcoding method of FIG. 3. For example, the processor 222 may be configured to execute an instruction according to a code of at least one program and a code of an OS included in the memory 221.

The distributed transcoding method according to the example embodiment may be performed by the server 150 and may generally include a process of splitting an original image into segments of a desired interval (S301), a process of parallel-transcoding each segment (S302), and a process of concatenating transcoded segments and merging the concatenated segments into a single encoded file (S303).

Figure 4:
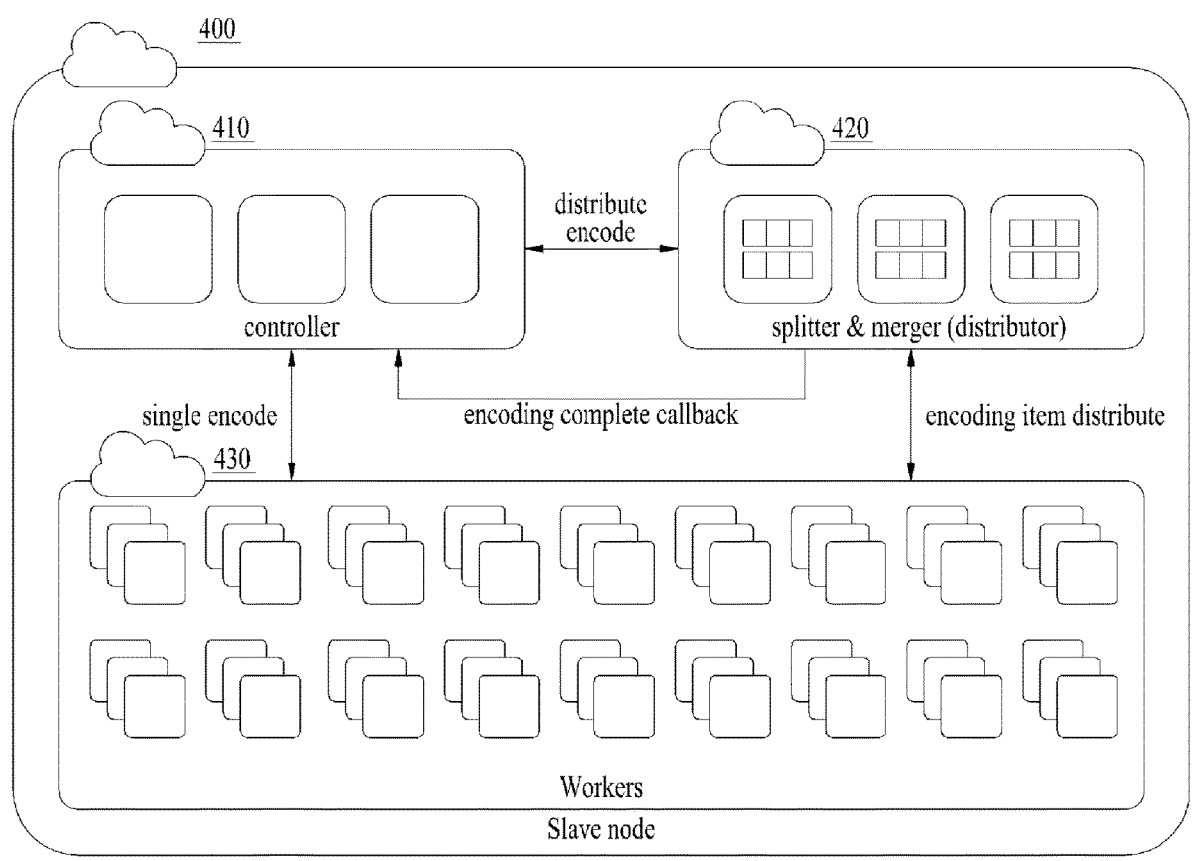
FIG. 4 illustrates an example of components includable in a distributed transcoding system according to one embodiment.

FIG. 4 illustrates an example of components includable in a distributed transcoding system according to an example embodiment.

Referring to FIG. 4, a distributed transcoding system 400 may include a controller 410, a splitter & merger (distributor) 420, and an encoding performer 430 as components for distributed transcoding. For example, the controller 410 and the splitter & merger 420 may be included in the processor 222 of the server 150 described above with reference to FIGS. 1 and 2. The encoding performer 430 is configured as a worker that is a unit transcoder to perform an encoding task. Each worker serves as an encoding server that performs a task allocated from the splitter & merger 420 as a separate computer apparatus connected to the server 150.

The controller 410 serves to manage an overall state of the encoding task. The controller 410 may control an encoding task required to provide a video service in response to a request from the electronic devices 110, 120, 130, 140.

The splitter & merger 420 is in charge of performing distributed transcoding as a distribution entity. In detail, the splitter & merger 420 serves to split an original image into segments of an appropriate size for the encoding task requested from the controller 410, and to distribute the segments to workers corresponding to the encoding performer 430, and to merge segments encoded at the respective workers into a single encoding result.

Each worker serves to encode a segment distributed from the splitter & merger 420 and to forward the encoded segment again to the splitter & merger 420.

Therefore, the distributed transcoding system 400 may split the original image and then perform parallel transcoding, thereby improving the overall encoding time and distributed encoding performance for the video service.

Hereinafter, example embodiments regarding an optimization to maximize the distributed encoding performance are further described.

Figure 5:
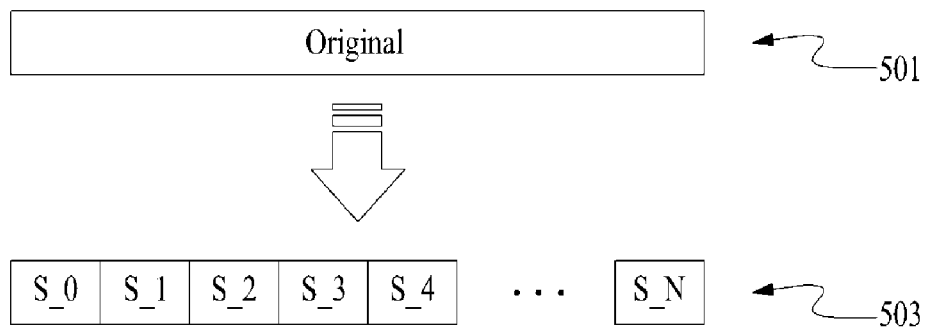
FIG. 5 illustrates an example of a process of splitting an original image according to one embodiment.

FIG. 5 illustrates an example of a process of splitting an original image according to an example embodiment.

Referring to FIG. 5, the splitter & merger 420 may split an original image 501 into a plurality of segments (S_0, S_1, S_2, ..., S_N) 503. In particular, the term "split" used herein refers to logical splitting instead of physically splitting data. That is, a read offset of each segment is designated by applying a logical splitting method to an original image.

Referring to FIG. 5, the splitter & merger 420 may split the original image 501 into the segments 503 of an appropriate size. For example, the splitter & merger 420 may split the original image 501 into the segments 503 of a group of pictures (GOP) unit. That is, the splitter & merger 420 splits the original image 501 based on a GOP boundary of a corresponding image. Here, if a GOP size of the original image 501 is large, the number of the segments 503 increases. As another example, the splitter & merger 420 may split the original image 501 based on a split unit (e.g., 4 seconds) of a preset size. If the length of the segments 503 is significantly short, the number of segments 503 increases, which leads to increasing encoding overhead. Meanwhile, if the length of the segments 503 is significantly long, a difference in an encoding complete time between workers increases. That is, the encoding load is not distributed evenly across workers, which causes the entire encoding time to increase. An appropriate length to minimize overhead occurring during an encoding process and to evenly distribute encoding load across the entire workers may be determined through experimentation. The splitter & merger 420 may split the original image 501 by using the determined length as a split unit. As another example, the splitter & merger 420 may basically split the original image 501 based on a GOP unit by using the split unit of the length determined through experimentation as a minimum unit and, if the GOP unit is less than the minimum unit, may split the original image 501 based on not the GOP unit but the minimum unit that is determined through the experiment.

Figure 6:
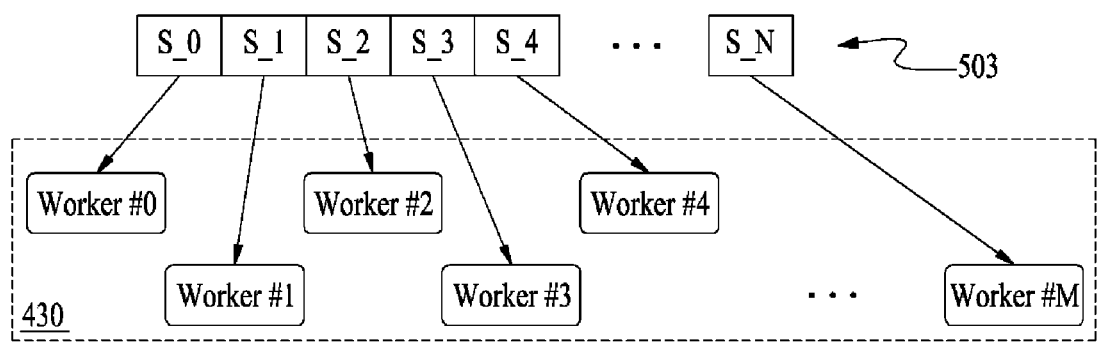
FIG. 6 illustrates an example of a process of distributing a split segment according to one embodiment.

FIG. 6 illustrates an example of a process of distributing a split segment according to an example embodiment.

Referring to FIG. 6, the splitter & merger 420 may appropriately forward the segments (S_0, S_1, S_2, ..., S_N) 503 to workers (Worker_0, Worker_1, Worker_2, ..., Worker_M) corresponding to the encoding performer 430. Here, M≤N Here, the splitter & merger 420 forwards read offset information of each segment 503 about the original image 501 stored in a storage system, for example, a network attached storage (NAS) (not shown), instead of physically splitting the original image 501 and forwarding actual data to the workers.

In a situation in which the storage system storing the original image 501 is mounted to each worker, the splitter & merger 420 may forward a read point of each segment to a corresponding worker. Here, each worker may read only a file of a segment allocated to a corresponding worker in the original image 501 stored in the storage system using a read point forwarded from the splitter & merger 420 and may perform encoding.

Therefore, according to example embodiments, it is possible to significantly reduce the amount of time used for image splitting and distribution by applying a method of forwarding only read offset information of each segment to a corresponding worker through logical splitting, instead of applying a method of physically splitting the original image 501 and forwarding actual data to workers.

Further, the splitter & merger 420 may follow the priority of a preset criterion to allocate the workers (Worker_0, Worker_1, Worker_2, ..., Worker_M) of the encoding performer 430 to each of the segments (S_0, S_1, S_2, ..., S_N) 503. For example, the splitter & merger 420 may initially allocate a worker corresponding to a maximum number of simultaneously available encodings. Since the number of encodings available at a time differs for each worker, the splitter & merger 420 may allocate workers in descending order of the number of available encodings. It is desirable to evenly distribute segments across the entire worker equipment. If a number of encodings are simultaneously performed at a single piece of equipment, the entire encoding speed increases and the encoding speed for each segment decreases. Therefore, to maintain an encoding speed in an optimal state, it is important to maximally prevent segments from being intensively allocated to a worker of specific equipment when allocating the segments to workers. As another example, the splitter & merger 420 may initially allocate a worker corresponding to the longest idle time. The splitter & merger 420 may allocate workers in descending order of an idle time into consideration of an idle time in which a segment is not allocated in the recent times. As another example, the splitter & merger 420 may allocate workers based on all of the number of available encodings and an idle time. For example, the splitter & merger 420 may initially allocate a worker corresponding to the largest number of available encodings and, if the number of available encodings is identical, may allocate a worker corresponding to the longest idle time.

Therefore, according to example embodiments, in the case of allocating split segments to workers, it is possible to enhance distribution efficiency by appropriately allocating the split segments based on priority in which the number of available encodings and/or an idle time of each worker is considered.

Also, if the original image 501 is split into N segments 503, the splitter & merger 420 may allocate segments based on the number of workers available for the original image 501. For example, if a 400-second video is split into 100 segments based on a unit of 4 seconds and 20 workers are available, 5 segments may be allocated to each worker.

Although segments with the same length are allocated, an encoding time may vary at each worker due to the complexity of an image. The splitter & merger 420 may allocate CPU resources based on the image complexity of a corresponding segment allocated to each worker. For example, the splitter & merger 420 may further allocate 1.5 to 2 times of CPU resources more than those for other workers to a worker in charge of a segment having a desired level of complexity or more to process encoding.

The image complexity may refer to an amount of information contained in an image, such as, for example, an image in which an amount of motion is large, an image in which a change in illumination is great, or an image in which a change in characters is great. For example, the image complexity may be determined through a method of selecting an image in a segment and measuring the level of change between images. As another example, the image complexity may use a method of initially applying an encoding process of quickly checking the image complexity. The image complexity of a corresponding segment may be determined by quickly encoding the segment at a low resolution (e.g., 256×144) and using result information acquired from the encoding. Alternatively, information acquired by quickly initially applying 1PASS process may be used to use data analyzed from 1PASS during 2PASS process of image encoding.

Therefore, according to example embodiments, in the case of allocating split segments to workers, it is possible to reduce the entire encoding time by allocating worker resources based on an image complexity and by guaranteeing a similar encoding speed between the workers.

Figure 7:
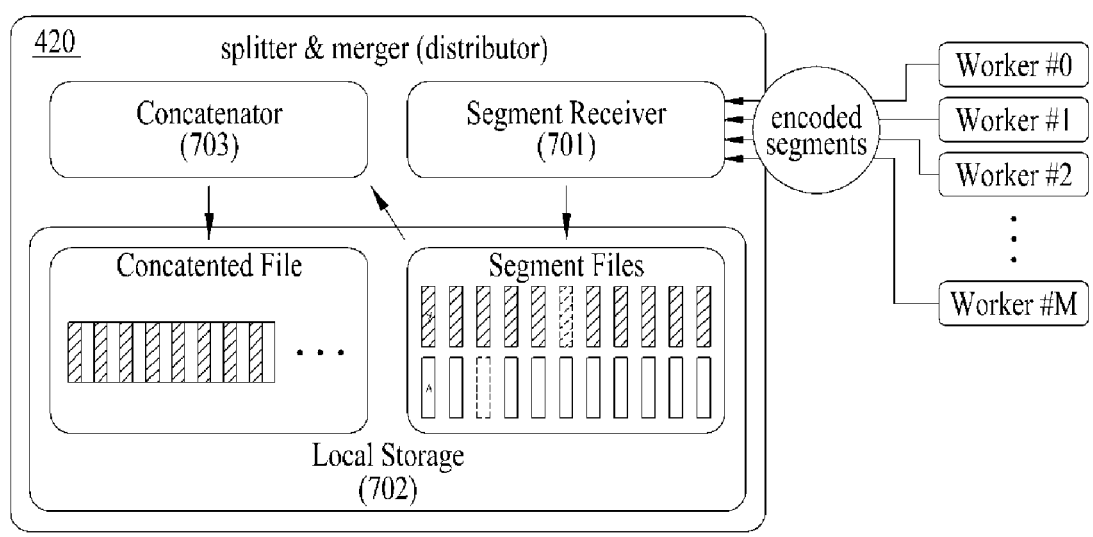
FIG. 7 illustrates an example of a process of merging encoded segments into a single encoding result according to one embodiment.

FIG. 7 illustrates an example of a process of merging encoded segments into a single encoding result according to an example embodiment.

Referring to FIG. 7, the splitter & merger 420 may include a segment receiver 701, a local storage 702, and a concatenator 703 as components for merging.

The segment receiver 701 serves to receive an encoded segment from each of the workers (Worker_0, Worker_1, Worker_2, . . . , Worker_M) to which the segments (S_0, S_1, S_2, . . . , S_N) 503 of the original image 501 are allocated.

To concatenate the segments encoded at the respective workers (Worker_0, Worker_1, Worker_2, . . . , Worker_M) in a single local storage 702 using the concatenator 703, a process of gathering the encoded segments is required.

The segment receiver 701 stores a segment file received from each of the workers (Worker_0, Worker_1, Worker_2, . . . , Worker_M) in the local storage 702. A data packet corresponding to a video may be separated into a video stream (V) and an audio stream (A), and distributed encoding may be performed on each of the video stream and the audio stream. A segment file for the video stream and a segment file for the audio stream may be separately stored in the local storage 702.

The concatenator 703 may generate an encoding result packet (i.e., a concatenated file) by sequentially concatenating the segment files stored in the local storage 702 in segment order based on segment split information of the original image 501. Here, the concatenator 703 may generate the segment file for the video stream and the segment file for the audio file into a single encoded file through temporal interleaving thereof, and may store the corresponding encoded file in the local storage 702 as a result.

Although it is described in the example embodiment that all of the video stream and the audio stream are processed using distributed encoding, the audio stream may be processed using single encoding and the video stream may be processed using distributed encoding depending on example embodiments.

Therefore, according to example embodiments, it is possible to further enhance a transcoding processing time by splitting the original image 501 into the segments 503 and performing parallel transcoding using a plurality of workers. Since the splitter & merger 420 appropriately distributes and allocates workers, it is possible to reduce a worker encoding time and an amount of time used to gather segments for merging.

Further, the distributed transcoding system 400 according to an example embodiment may adjust an encoding speed in real time by flexibly controlling an amount of resources to be allocated to a worker during encoding. That is, the distributed transcoding system 400 may adjust the entire encoding speed by adjusting a number of workers to be used for encoding in real time if necessary.

The distributed transcoding system 400 may determine the number of workers based on an encoding urgency at a start point in time of encoding or a resource status. Here, the distributed transcoding system 400 may adjust the number of workers in real time based on a status during encoding.

For example, if highly urgent content, such as breaking news, is received, and here, if there is no sufficient amount of resources to secure an encoding speed, a task for the highly urgent content may be performed by excluding resources for some workers being used for content currently being encoded.

Figure 8:
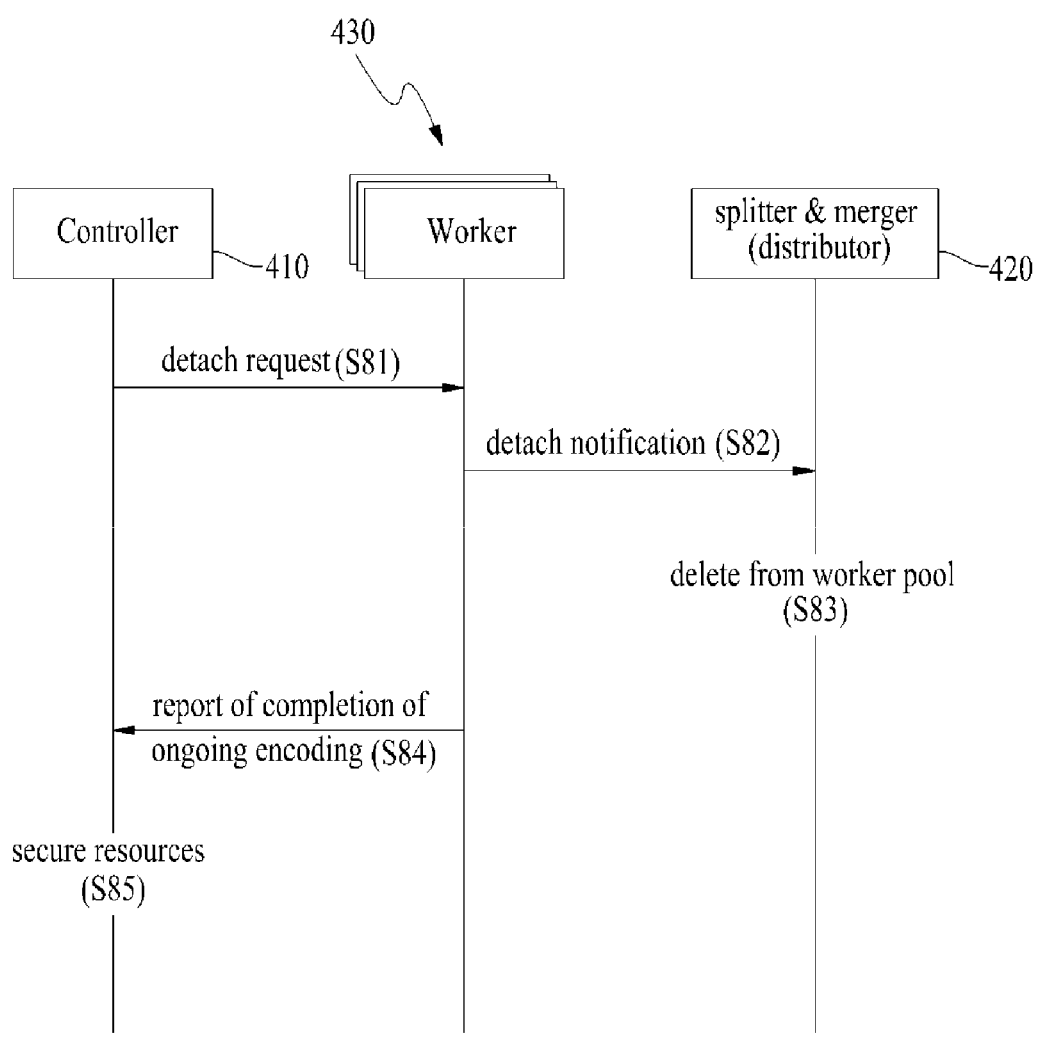
FIG. 8 illustrates an example of a process of decreasing an encoding speed by reducing the number of workers according to one embodiment.

FIG. 8 illustrates an example of a process of decreasing an encoding speed by reducing the number of workers according to an example embodiment.

Referring to FIG. 8, in operation S81, if an amount of resources required for newly received content A is insufficient, the controller 410 sends a detach request to workers corresponding to an amount of insufficient resources.

In operation S82, in response to the detach request, the workers forward a detach notification to the splitter & merger (distributor) 420 that distributes a task to the workers.

In operation S83, the splitter & merger 420 excludes the workers sending the detach notification from a worker pool allocated to content B currently being encoded.

In operation S84, the workers receiving the detach request continue a segment encoding task being performed at a point in time at which the detach request is received, and forward a task complete report to the controller 410 if the corresponding task is completed.

In operation S85, the controller 410 retrieves the workers from which the task complete report is received and secures the retrieved workers as resources for the content A.

As described above, the distributed transcoding system 400 may decrease an encoding speed for the content B by excluding a portion of worker resources used for the content B.

Figure 9:
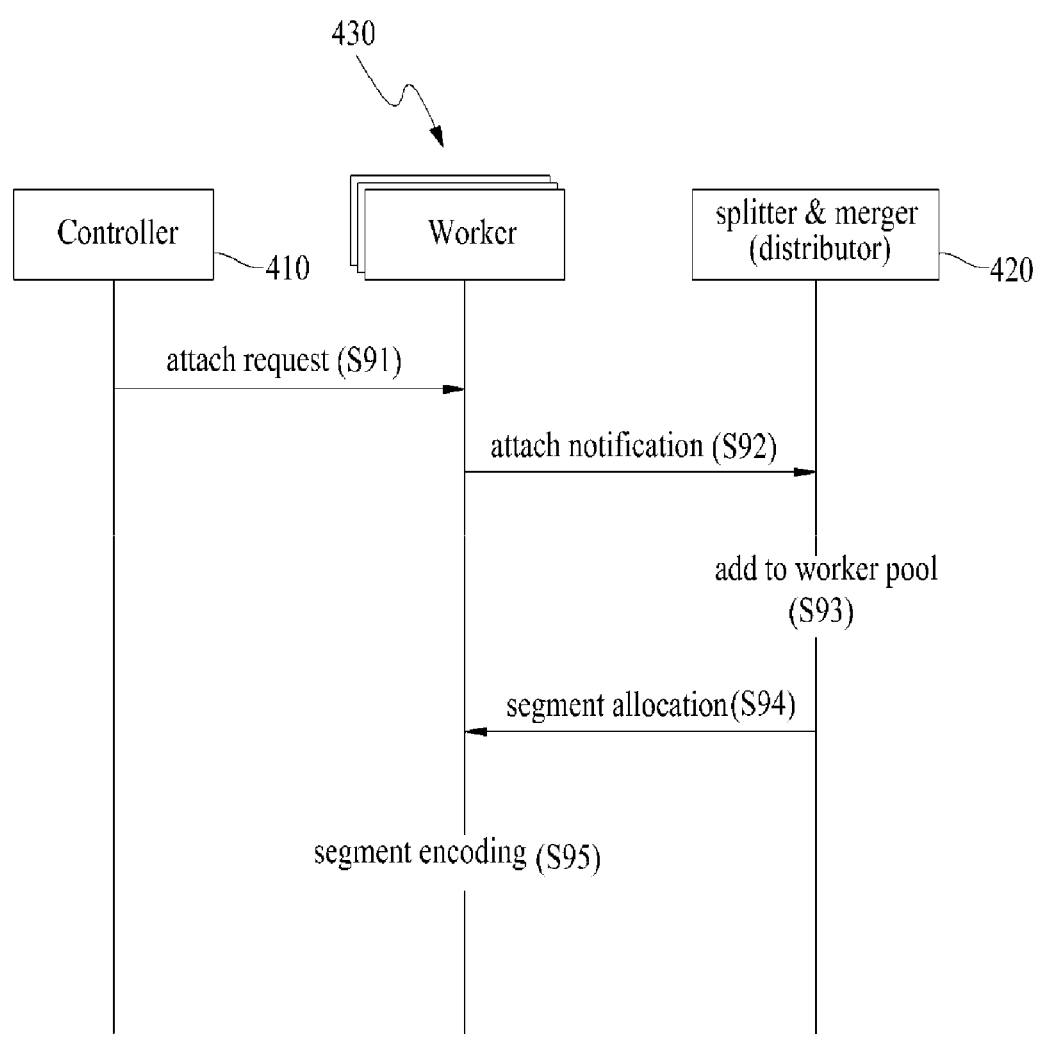
FIG. 9 illustrates an example of a process of increasing an encoding speed by increasing the number of workers according to one embodiment.

FIG. 9 illustrates an example of a process of increasing an encoding a speed by increasing a number of workers according to an example embodiment.

Referring to FIG. 9, in operation S91, if resources for content A are secured, the controller 410 notifies newly attached workers of information of the splitter & merger 420 in charge of an encoding task of the content A and sends an attach request to workers.

In operation S92, in response to the attach request, the workers forward an attach notification to the splitter & merger (distributor) 420 in charge of an encoding task of the content A.

In operation S93, the splitter & merger 420 adds the newly attached workers to a worker pool allocated to the content A.

In operation S94, the splitter & merger 420 allocates a segment for the encoding task of the content A to the newly attached workers.

In operation S95, the newly attached workers perform a task of encoding the segment allocated by the splitter & merger 420.

As described above, the distributed transcoding system 400 may increase an encoding speed for the content A by adding worker resources to the content A.

Therefore, the distributed transcoding system 400 may adjust the number of workers to be used for encoding if necessary and accordingly, may place worker resources being used for content currently being encoded as resources for another content.

The apparatuses described herein may be implemented using hardware components, software components, and/or a combination thereof. For example, the apparatuses and the components described herein may be implemented using one or more general-purpose or special purpose computers or processing devices, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device implementing the apparatuses described herein may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring a processing device to operate as desired. Software and/or data may be embodied in any type of machine, component, physical equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the example embodiments may be configured in a form of program instructions performed through various computer devices and recorded in non-transitory computer-readable media. Here, the media may continuously store computer-executable programs or may transitorily store the same for execution or download. Also, the media may be various types of recording devices or storage devices in a form in which one or a plurality of hardware components are combined. Without being limited to media directly connected to a computer system, the media may be distributed over the network. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of other media may include record media and storage media managed by Appstore that distributes applications or a site that supplies and distributes other various types of software, a server, and the like.

While the example embodiments are described with reference to specific example embodiments and drawings, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, or replaced or supplemented by other components or their equivalents.

Therefore, other implementations, other example embodiments, and equivalents of the claims are to be construed as being included in the claims.

What is claimed is:

1. A distributed transcoding method performed by a server implemented as a computer, the distributed transcoding method comprising:
   logically splitting image content into segments of a desired interval designated by a read offset of each segment;
   allocating the split segments to a plurality of workers by sending read offset information of the allocated split segments to the workers without sending the image content of the allocated split segments, performing parallel transcoding of the allocated split segments by corresponding workers, and receiving segment files of the allocated split segments encoded in parallel by the corresponding workers based on the read offset information of the allocated split segments, wherein allocating the split segments to the workers is based on preset allocation criterion associated with the workers, such that the split segments are allocated to one or more of the workers based on the present allocation criterion; and
   concatenating the transcoded segments and merging the concatenated segments into a single encoded file,
   wherein each of the corresponding workers performs the transcoding by reading a split segment allocated to the each of the workers using the read offset information sent, without the image content of the allocated split segments, to said each of the workers, and
   wherein the image content includes a group of pictures defined as a GOP unit and the logically splitting comprises:
      splitting the image content into segments of the GOP unit in response to a segment of the GOP unit not being smaller in length than a segment of a predetermined minimum unit; and
      splitting the image content into segments of the predetermined minimum unit in response to a segment of the GOP unit being smaller in length than a segment of the predetermined minimum unit.

2. The distributed transcoding method of claim 1, wherein the performing of parallel transcoding comprises allocating the split segments based on a priority using at least one of a number of simultaneously available encodings and an idle time of the workers.

3. The distributed transcoding method of claim 1, wherein the performing of parallel transcoding comprises allocating central processing unit (CPU) resources to each of the workers to which a segment is allocated, based on an image complexity of the segment.

4. The distributed transcoding method of claim 1, wherein the merging of the concatenated segments comprises:
   storing the received segment files in a storage; and
   sequentially concatenating segment files stored in the storage and generating a result packet for the image content.

5. The distributed transcoding method of claim 1, further comprising adjusting a number of workers allocated to the split segments during the encoding of the split segments.

6. The distributed transcoding method of claim 5, wherein the adjusting of the number of workers comprises decreasing an encoding speed for the split segments by excluding a portion of workers from a worker pool allocated to the split segments.

7. The distributed transcoding method of claim 5, wherein the adjusting of the number of workers comprises increasing an encoding speed for the split segments by adding at least one worker to a worker pool allocated to the split segments.

8. The distributed transcoding method of claim 1, wherein the preset allocation criterion includes at least one of: allocating a predetermined number of the split segments to each of the workers, allocating the split segments based on availability of the workers, and allocating the split segments to the workers based on idle time of the workers.

9. A non-transitory computer-readable record medium storing a program for implementing a distributed transcoding method, the program when executed by a computer causing the computer to perform the steps comprising:
logically splitting image content into segments of a desired interval designated by a read offset of each segment;
allocating the split segments to a plurality of workers by sending read offset information of the allocated split segments to the workers without sending the image content of the allocated split segments, performing parallel transcoding of the allocated split segments by corresponding workers, and receiving segment files of the allocated split segments encoded in parallel by the corresponding workers based on the read offset information of the allocated split segments, wherein allocating the split segments to the workers is based on preset allocation criterion associated with the workers, such that the split segments are allocated to one or more of the workers based on the present allocation criterion; and
concatenating the transcoded segments and merging the concatenated segments into a single encoded file,
wherein each of the corresponding workers performs the transcoding by reading a split segment allocated to the each of the workers using the read offset information sent, without the image content of the allocated split segments, to said each of the workers, and
wherein the image content includes a group of pictures defined as a GOP unit and the logically splitting comprises:
splitting the image content into segments of the GOP unit in response to a segment of the GOP unit not being smaller in length than a segment of a predetermined minimum unit; and
splitting the image content into segments of the predetermined minimum unit in response to a segment of the GOP unit being smaller in length than a segment of the predetermined minimum unit.

10. The non-transitory computer-readable record medium of claim 9, wherein the preset allocation criterion includes at least one of: allocating a predetermined number of the split segments to each of the workers, allocating the split segments based on availability of the workers, and allocating the split segments to the workers based on idle time of the workers.

11. A distributed transcoding system comprising:
at least one processor configured to execute computer-readable instructions stored in a memory, wherein the at least one processor is configured to perform the processes including,
logically splitting image content into segments of a desired interval designated by a read offset of each segment,
allocating the split segments to a plurality of workers by sending read offset information of the allocated split segments to the workers without sending the image content of the allocated split segments, performing parallel transcoding of the allocated split segments by corresponding workers, and receiving segment files of the allocated split segments encoded in parallel by the corresponding workers based on the read offset information of the allocated split segments, wherein allocating the split segments to the workers is based on preset criterion associated with the workers, such that the split segments are allocated to one or more of the workers based on the present allocation criterion; and
concatenating the transcoded segments and merging the concatenated segments into a single encoded file,
wherein each of the corresponding workers performs the transcoding by reading a split segment allocated to the each of the workers using the read offset information sent, without the image content of the allocated split segments, to said each of the workers, and
wherein the image content includes a group of pictures defined as a GOP unit and the logically splitting comprises:
splitting the image content into segments of the GOP unit in response to a segment of the GOP unit not being smaller in length than a segment of a predetermined minimum unit; and
splitting the image content into segments of the predetermined minimum unit in response to a segment of the GOP unit being smaller in length than a segment of the predetermined minimum unit.

12. The distributed transcoding system of claim 11, wherein the process of performing parallel transcoding comprises allocating the split segments based on a priority using at least one of a number of simultaneously available encodings and an idle time of the workers.

13. The distributed transcoding system of claim 11, wherein the process of performing parallel transcoding comprises a process of allocating central processing unit (CPU) resources to each of the workers to which a segment is allocated, based on an image complexity of the segment.

14. The distributed transcoding system of claim 11, wherein the process of merging the concatenated segments includes storing the received segment file in a storage, and sequentially concatenating segment files stored in the storage and generating a result packet for the image content.

15. The distributed transcoding system of claim 11, wherein the at least one processor is configured to perform a process of adjusting a number of workers allocated to the split segments during the encoding of the split segments.

16. The distributed transcoding system of claim 15, wherein the process of adjusting the number of workers includes decreasing an encoding speed for the image content by excluding a portion of workers from a worker pool allocated to the split segments, or increasing an encoding speed for the image content by adding at least one worker to the worker pool allocated to the split segments.

17. The distributed transcoding system of claim 11, wherein the preset allocation criterion includes at least one of: allocating a predetermined number of the split segments to each of the workers, allocating the split segments based on availability of the workers, and allocating the split segments to the workers based on idle time of the workers.

* * * * *